Nov. 18, 1952 J. M. NOVAK Re. 23,587

MNEMONIC EDUCATIONAL MEANS FOR DEMONSTRATING ATOMIC OR MOLECULAR STRUCTURE AND PHENOMENA

Original Filed March 10, 1951 5 Sheets-Sheet 1

INVENTOR.

John M. Novak.

INVENTOR.

John M. Novak.

INVENTOR.

John M. Novak.

INVENTOR.

John M. Novak.

INVENTOR.

John M. Novak

Reissued Nov. 18, 1952

Re. 23,587

UNITED STATES PATENT OFFICE 23,587

MNEMONIC EDUCATIONAL MEANS FOR DEMONSTRATING ATOMIC OR MOLECULAR STRUCTURE AND PHENOMENA

John M. Novak, San Francisco, Calif.

Original No. 2,598,591, dated May 27, 1952, Serial No. 214,944, March 10, 1951. Application for reissue July 26, 1952, Serial No. 301,170

5 Claims. (Cl. 35—18)

Matter enclosed in heavy brackets [ ] appears in the original patent but forms no part of this reissue specification; matter printed in italics indicates the additions made by reissue.

This invention relates to improvements in educational devices and has particular reference to models for the purpose of demonstrating the reactions taking place between molecules and in accordance with any theory which my models will fit into.

A further object is to provide a means whereby the visual education can take place, thereby enabling the student to more readily grasp the action of the electrons of various elements as they progress through their various orbits.

Other objects and advantages will be apparent during the course of the following description.

In the accompanying drawings forming a part of this specification,

In the teaching of the behaviour of particles which go to form various substances, it is very difficult for the average individual to recognize the various parts which go to make up an iron atom and the action of these particles in combining to form the iron atom and also the various orbits through which the electrons revolve.

I have, therefore, devised a means of teaching this intricate subject through the use of a plurality of doughnut-shaped objects, pointed cylinders and spheres, which, together with wire groupings may be assembled in a plurality of various patterns, each one of which may represent a fundamental grouping, such as would be found in an iron atom, a copper atom, or any other desired element that is to be shown. The various parts of these assemblies may be secured to one another by means of a plastic cement so as to permit safe and easy handling.

In this specification I shall describe a model of a negatively ionized iron atom being bombarded by a proton. Also an iron atom in a state of magnetization.

The model is made of plastic and wire. Although certain color schemes, materials and relative sizes are used in these models, it is understood that other materials and sizes may be used. And that the color scheme may be changed or dispensed with.

This atomic model is for use in teaching atomic physics according to my method of presentation. This is an artificial concept and is not to be construed as constituting the actual construction of atoms, but is merely an imaginary visualization for use of students as a memory aid. The postulates mentioned herein, and the tentative models shown are to be considered only as mnemonic devices, and are not to be thought of as being necessarily scientifically true.

Although the iron atom is described here, it is understood that other atomic models may be constructed on the same plan by using more or less of the components used in this model.

PROTON

Figure 1:
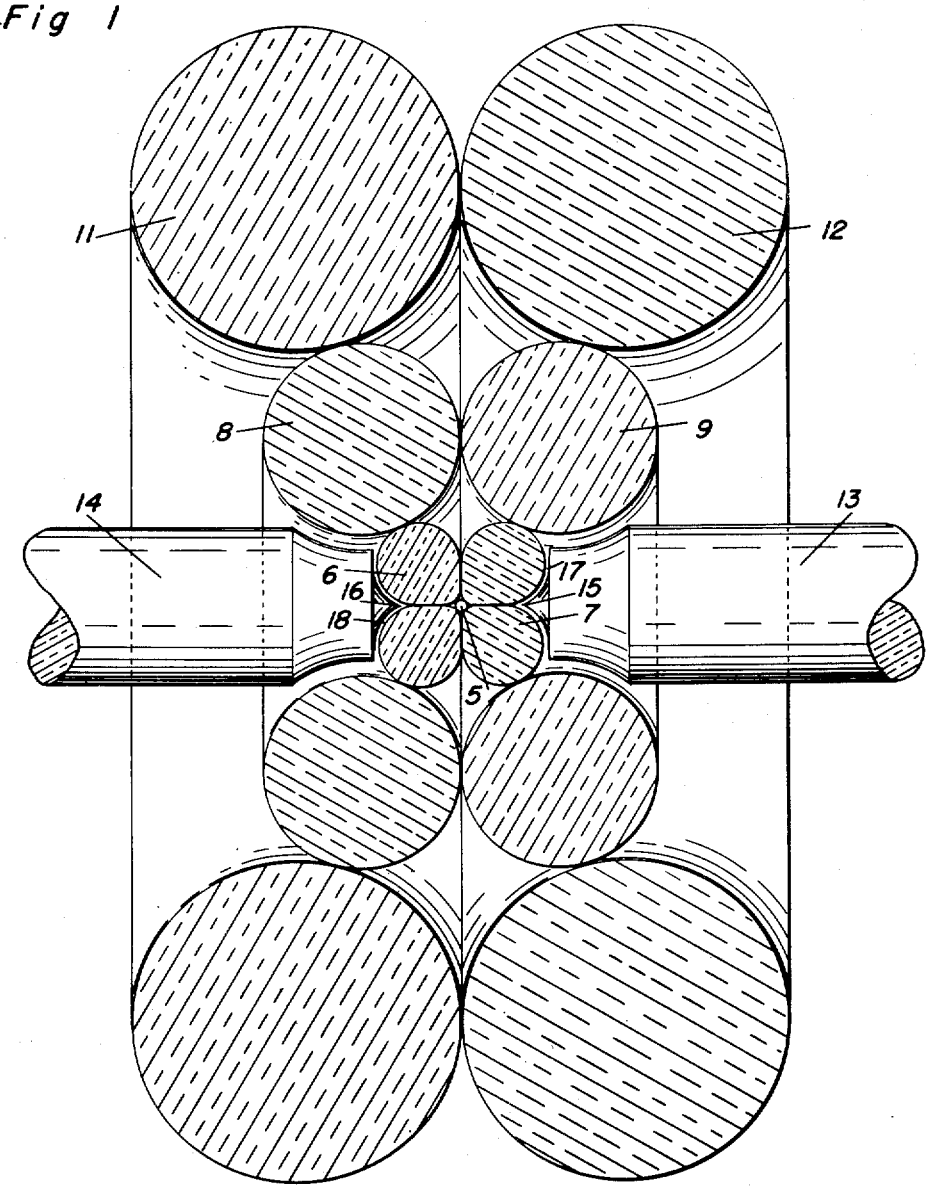
Fig. 1 is a cross sectional view showing several of my educational pieces assembled to illustrate the correlation between several elements of a proton.
Figure 2:
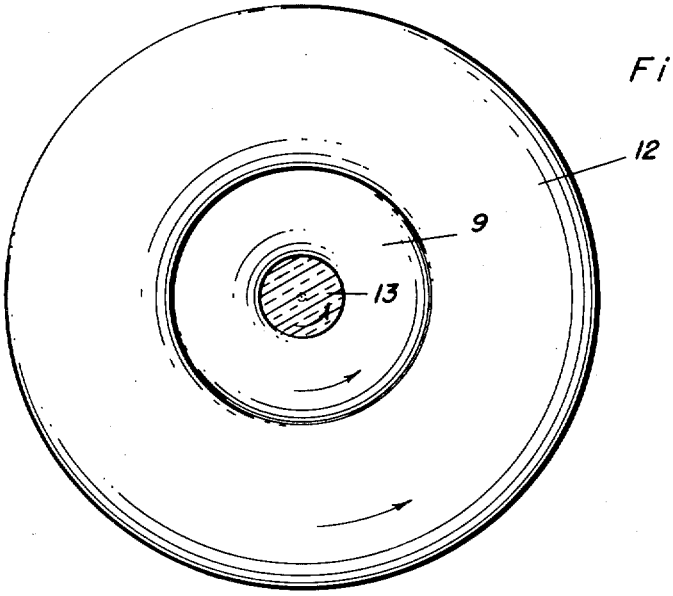
Fig. 2 is a side view of Fig. 1, taken on a reduced scale.

Referring to Figs. 1 and 2, the nucleus numeral 5, is to consist of a small black opaque sphere with an arrow showing rotation, representing a greatly enlarged unit particle of ether in rotation. For ease of explanation the axis of rotation shall be called the poles while the circle at which greatest motion occurs shall be called the equator.

Surrounding this nucleus are two adjacent gray, translucent doughnut-shaped objects 6 and 7 with arrows indicating rotation in the same direction as the nucleus; as a representation of a vortex ring orbit capable of being occupied. The axes of these vortex rings extend in the same plane as the poles of the nucleus.

Surrounding this pair of vortex ring representations are additional concentric, clear, transparent adjacent pairs of doughnut-shaped objects to represent vortex ring optical orbits. Arrows indicating rotary motion in the same direction as the nucleus are also on these. The thickness of these vortex rings increases in the ratio 1, 3, 5, 7, 9, 11, etc. These vortex rings are assembled so that their axes lie in the same plane as the axis of the nucleus.

Although only the orbit capable of being occupied 6 and 7 and two optical orbits 8, 9 and 11, 12 are shown in the drawing, it is understood that many other optical orbits exist. The points 15, 16 of two solid, pointed transparent cylinders 13, 14 with arrows indicating rotation in the same direction as the nucleus and of the same diameter as the first pair of vortex rings shall be placed, one in each axis, 17, 18 in the first pair of vortex rings to indicate the field of gravitation.

NEUTRON

Figure 3:
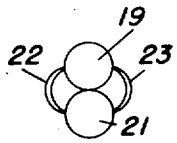
Fig. 3 is a schematic representation of a neutron.

Referring to Fig. 3, the neutron consists of a black sphere 19 representing a proton nucleus and a gray sphere 21 representing an electron nucleus and with wires 22 and 23 connecting the poles as a representation of magnetic binding. Arrows (which are not shown), pointing in opposite directions, may be placed on the spheres to indicate rotation.

ELECTRON

A. Extra-orbital electron

Figure 4:
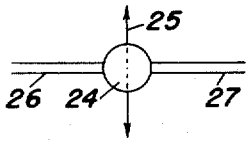
Fig. 4 is a schematic representation of an extra-orbital electron.
Figure 5:
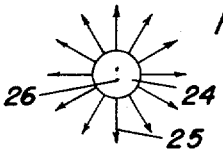
Fig. 5 is a side view of Fig. 4.

Referring to Figs. 4 and 5, the nucleus 24 consists of a dark gray sphere of the same size as the proton nucleus 5. An arrow indicating rotation may be placed on this sphere. The gray nucleus indicates a slower rotation than the black proton nucleus. Extending from the poles of the sphere are bunched wires 26 and 27, of smaller total diameter than sphere, representing electro-magnetic lines of force caused by rotation of the viscous ether. Surrounding the equator radially are wire arrows 25 pointing outward, representing particles of ether thrown outward and constituting the electrostatic field.

B. Orbital electrons

Figure 6:
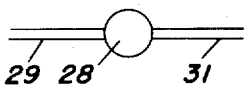
Fig. 6 is a schematic representation of an orbital electron.
Figure 7:
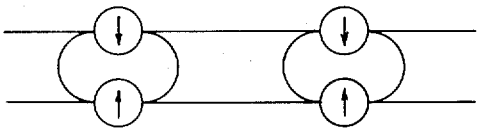
Fig. 7 is a schematic representation of electro-magnetically [interlocker] *interlocked* orbital electron pairs.
Figure 8:
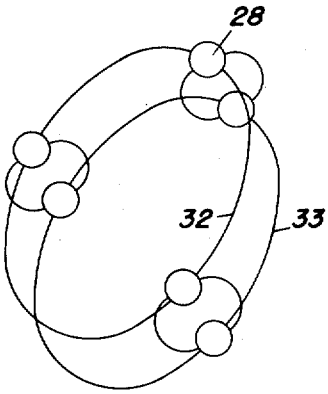
Fig. 8 illustrates a schematic representation of three electro-magnetically interlocked orbital electron pairs forming a sub-orbit.

Referring to Fig. 6, an orbital electron, the nucleus 28 is identical with the nucleus 24. Numerals 29 and 31 refer to bunched wires similar to 26 and 27, and represent electro-magnetic fields extending from the poles. An orbital electron is represented as having only electro-magnetic fields and therefore attracting other orbital electrons. Fig. 7 shows the interlocking of the electro-magnetic fields of paired orbital electrons. Fig. 8 shows three electro-magnetically interlocked orbital electron pairs forming a suborbit. While those parts of the electro-magnetic fields 32 and 33, linking orbital electrons on the same vortex ring are shown as forming a circle, it is understood that they are shown thusly merely for ease of depiction.

C. Valence electrons. Figs. 9 through 16

Figs. 9 through 16 are representations of the various possible valences, in which the outer valence orbit of an atom contains from one electron to four pairs of electrons. Part of the electro-magnetic field of unpaired valence electrons is shown as extending out from the atom.

Figure 9:
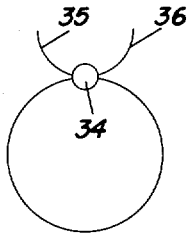
Figs. 9, 10, 11, 12, 13, 14, 15 and 16 illustrate schematic representations of various combinations of electrons in valence orbits.
Figure 10:
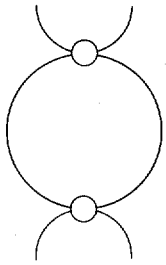
Figure 11:
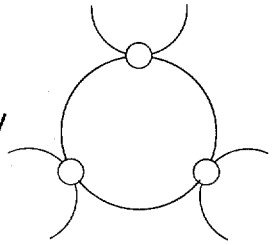
Figure 12:
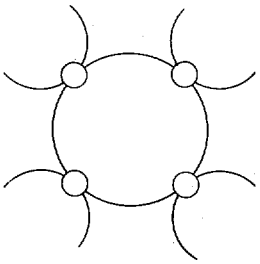
Figure 13:
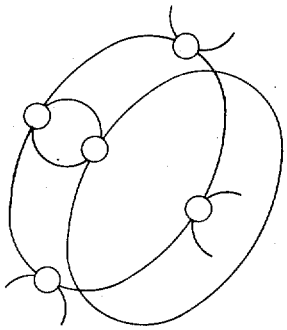
Figure 14:
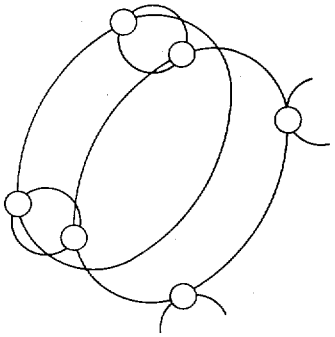
Figure 15:
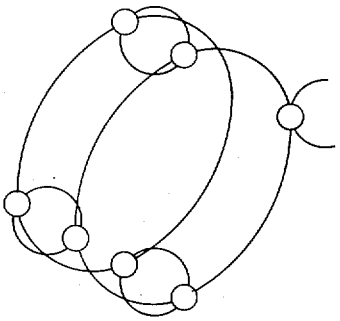
Figure 16:
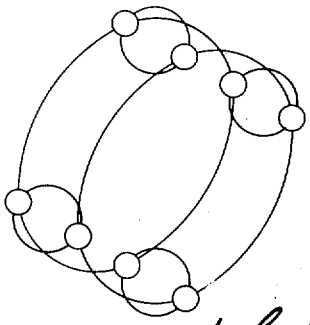

It is understood that in the transition elements some of the electrons in an inner suborbit may also be valence electrons. Fig. 9 is the representation of a valence of plus one. The nucleus 34 is identical with numeral 24; however, part of the electro-magnetic field 35, 36 of this unpaired valence electron is shown as extending out from the atom. In a similar manner Fig. 10 represents a valence of plus two. Fig. 11, a valence of plus three, Fig. 12 a valence of plus four, or minus 4; Fig. 13 is a valence of minus three; Fig. 14, a valence of minus two; Fig. 15, a valence of minus one; and, finally, Fig. 16 represents the zero valence of an inert atom in which all the valence electrons are paired. In these drawings the two suborbits of the valence major orbit are represented as merged into one orbit. However, conventional equivalents may be substituted. For instance, the arrangement in Fig. 16 (the valence electrons of an inert atom other than helium), may be replaced by representations of two electrons electro-magnetically bound, resting on one adjacent side of a doughnut-shaped object as a representation of the first fully occupied suborbit and three electro-magnetically interlocked pairs of electrons immediately surrounding the first two electrons, resting on adjacent sides of the doughnut-shaped objects as a representation of the second fully occupied valence suborbit.

*In the representation of molecular structure, the wires representing the valence bonds extending from an unpaired valence electron of an atom are joined to similar wires extending from an unpaired valence electron representation of another atom. The wires may be twisted together, soldered, or otherwise joined to illustrate the pairing of the valence electrons of various atoms to form molecules. When the assemblies are thus used to show molecular structure, the optical orbit and gravitational field representations may be dispensed with for the sake of simplicity.*

The representation of electro-magnetic fields and electrostatic fields by means of wires does not restrict representation of these fields by other means.

MAGNETIZED IRON ATOM

Figure 17:
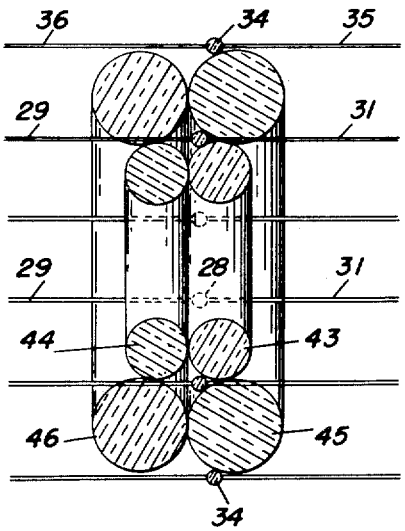
Fig. 17 is a cross sectional view of a magnetized iron atom representation.

Fig. 17 is a cross section of a magnetized iron atom representation. In this model only the third 43, 44, and fourth 45, 46, major orbits will be used, it being understood that the inner orbits and the optical orbits are the same as in an unmagnetized iron atom. First, we shall take the third major orbit 43, 44. The first and second suborbits of the third major orbit are the same as in an unmagnetized atom and are not shown; however, the third suborbit no longer consists of three pairs of interlocked electrons. All six orbital electrons 28 in the third suborbit are now on the outer edge of one of the vortex rings 43, with their axis of rotation in almost the same plane as the axis of the iron nucleus. The direction of rotation is opposite to that of the iron nucleus and the electro-magnetic fields 29, 31 no longer interlock but extend outwardly from the atom in nearly the same plane as the axis of the nucleus. The wires forming the electro-magnetic field representations are sharply pointed and easily pierce through the vortex rings which are made of a plastic material having a cellular, spongeous texture. The electro-magnetic fields 35, 36 of the valence electrons 34 in the fourth major orbit now also extend outwards in the same plane as those in the third suborbit of the third major orbit with the direction of rotation of these electrons also opposite to that of the iron nucleus. The valence electrons occupy that vortex ring 45 which is directly around the one occupied by the electrons in the third suborbit. The valence electrons are attached to this vortex ring by means of an adhesive substance so as to permit handling of the model.

This model represents the magnetic moment of a magnetized iron atom as being equivalent to eight electron electro-magnetic fields.

By electro-magnetic fields, as used above, is meant the representation of such by means of wires or other means.

*NEGATIVELY IONIZED IRON ATOM BOMBARDED BY A PROTON*

Figure 18:
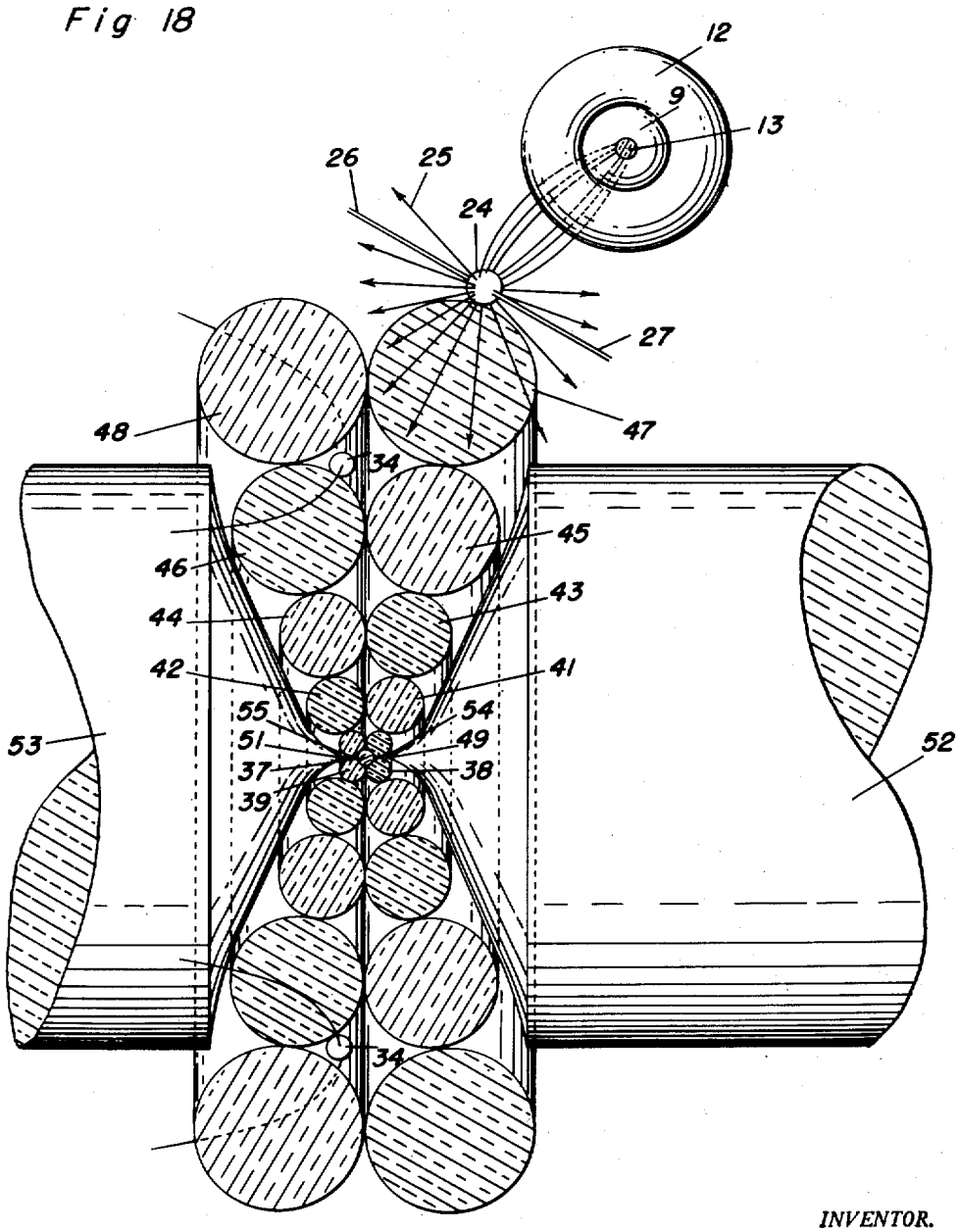
Fig. 18 is a cross sectional view of several of my educational pieces assembled and shown in cross section to illustrate the action of an iron atom, together with a perspective view of an extra-orbital electron, and a side view of a proton.

Fig. 18 shows a negatively ionized iron atom being bombarded by a proton. The iron atom 37 through 55 is drawn in cross section. The extra orbital electron 24 through 27 is drawn in perspective. The proton 9, 12, 13 is drawn in side view. The iron atom, the extra-orbital electron, and the proton are drawn to different scales.

It is understood that the placement of electrons in certain positions and definite angular distances apart in this model does not preclude other positions and angular distances.

The words "electrons" and "electron representations" are used synonymously in this explanation. Also, the words "vortex pair," "doughnut-shaped objects," and "major orbits," are synonymous herein.

The nucleus 37 consists of a white opaque sphere somewhat larger than the nucleus of the proton. Painted on this sphere are several drawings of proton nuclei and of neutrons, together with an arrow to indicate composite rotatory directional effect of component parts. Surrounding this is an adjacent pair of dark gray translucent doughnut-shaped objects 38, 39, representing the first occupied orbit. These doughnut-shaped objects are one-fourth the thickness of the first pair of such objects in the proton. Arrows indicating rotation in the same direction as the nucleus are placed on these objects. On the outer circumference of one of these objects, on the side adjacent to the other of these objects, are placed two orbital electrons, (not shown in the drawing), 180 degrees apart and with their electro-magnetic fields connecting to form a distorted circle. The arrows on the electrons indicate attempted motion substantially toward the iron nucleus. Surrounding this pair of vortex representations is another concentric adjacent pair 41, 42, of a slightly lighter tint of gray. The thickness of this second pair is three times the thickness of the first pair. Arrows indicating rotation in the same direction as the nucleus are also on this pair. Two electron representations (not shown in drawing), are placed on one of these as in the first orbit, except that [there] *these* are 144 degrees apart. Immediately around these two electron representations are representations of three interlocked pairs of electrons (not shown in drawing), resting on adjacent sides of the vortices and with arrows indicating attempted travel toward nucleus. This means that one of vortices will have 5 electrons and the other 3. Those electrons on vortex that contains 5 electrons are radially spaced 72 degrees apart. This particular arrangement is used to indicate the two completed suborbits of the second major orbit 41, 42.

Surrounding the second pair of vortices is a third concentric pair 43, 44, of a slightly lighter tint than the second. This also has arrows indicating rotation in same direction as nucleus and is five times the thickness of the first pair. On adjacent sides of this pair as in the second are electron representations. First are two spaced electrons (not shown), electromagnetically joined. Immediately around these are three interlocked pairs (not shown). *Around these are three more interlocked pairs (not shown).* This means that one vortex has six electrons and the other eight electrons. The electrons on the vortex containing eight electrons are radially spaced 45 degrees apart. This arrangement is used to indicate the three suborbits of the third major orbit, the first two suborbits being represented as completed. The third suborbit is incomplete in this particular atom model, but will contain five pairs when complete. Surrounding the third vortex pair is another concentric pair of doughnut-shaped objects 45, 46, of a slightly lighter tint, with arrows indicating rotation in the same direction as the nucleus 37. The thickness of this pair is 7 times the thickness of the first pair. On an adjacent side of one vortex 46 are two valence electrons 34, 180 degrees apart and with their electro-magnetic fields joined, as shown in Fig. 10. In addition, these electrons have part of their electromagnetic fields extending outward from the atom model through the vortex rings which are made of a spongeous plastic material. These two electrons are representations of the valence electrons of the iron atom.

These four variously tinted concentric adjacent pairs of doughnut-shaped objects are representations of the occupied orbits of the iron atom; the different tints representing variations in energy of the orbits. The axes of these doughnut shaped objects lie in the same plane as the axis of the nucleus.

Surrounding the fourth vortex pair is a clear transparent concentric adjacent pair of doughnut-shaped objects 47, 48 nine times the thickness of the first pair. These also have arrows indicating rotation in the same direction as the nucleus. This is a representation of the first optical orbit of the iron atom. On the adjacent outer surface of one of these objects 47 is placed the nucleus 24 of an extra-orbital electron with the arrow of rotation indicating attempted travel toward the iron nucleus. This is the ionizing electron. The electro-magnetic field 26, 27 extends straight outward while the electrostatic field representation 25 extends through the transparent vortices only to the tinted vortices. Resting on the electrostatic field extending outward is a representation of a proton 9, 12, 13 whose axis of rotation is in the same plane as the extra-orbital electron axis and which is rotating in the same direction. The electrostatic field is distorted toward the proton.

Two solid transparent pointed cylinders 52, 53 of same diameter as the four tinted vortex pairs and with arrows indicating rotation in the same direction as the iron nucleus are placed with the points 49, 51, resting in the outer openings 54, 55, of the first vortex pair 38, 39. This is a representation of the gravitational field extending outward from the occupied orbits.

Now, then, it is seen that by associating atomic physics theory with artificial dynamic analogies, I have perfected a method for teaching the physical characteristics of the atom and of molecular phenomena, by means of models, in such a manner that these characteristics and phenomena are easily remembered.

Although certain geometrical figures, proportionate sizes, number of parts, and arrangement of parts are used in this preferred construction, it is understood that other geometrical figures, proportionate sizes, number of parts, and arrangement of parts may be substituted without departing from the spirit of the invention or the scope of the subjoined claims.

Having thus described my invention, I claim:

1. A mnemonic educational device for demonstrating atomic and molecular structure and phenomena comprising: a sphere representing atomic nucleus; means for representing the occupied and optical atomic orbits surrounding said sphere, said means including a series of pairs of concentric nestable toroidal members surrounding said sphere, the cross sectional diameter of successive ones of the toroidal members being related in accordance with an arithmetical progression, the axes of all said members being coincident and corresponding to an axis of the sphere; means for representing valence, orbital and extra-orbital electrons associated with said toroidal members comprising spheres positionable within the spaces defined by adjacent pairs of said toroidal members; means for designating electrostatic fields, electro-magnetic fields and valence bonding associated with selected ones of said electron designating means comprising wires fixed to the electron designating means and adapted to be pierced through the toroidal members; and means for representing gravitational fields associated with said occupied atomic orbit designating means.

2. Mnemonic educational means for demonstrating atomic and molecular structure and phenomena according to claim 1, characterized by the further fact that the representation of the atomic nucleus is made of a black plastic material, and in which the representations of the various occupied and optical orbits are arranged concentrically and in the same plane around the representation of the nucleus and are made of a plastic material in varying shades of gray, and in which the representation of an extra-orbital electron is made of a gray plastic material and has pointed wires extending from the equator as a representation of the electrostatic field and has wires extending from the poles as a representation of the electro-magnetic field, and in which the representations of orbital electrons are made of a gray plastic material with wires extending from the poles as a representation of the electromagnetic field and which are placed substantially between the outer edges of the representation of an occupied orbit, and in which the representations of valence electrons are made of a gray plastic material and have wires extending from the poles as a representation of the electromagnetic field and part of which wires are bent so as to project outwardly from the orbital representation between whose adjacent sides the valence electron representations are resting, [and in which the representation of a neutron is made of a black plastic material and a gray plastic material and which have wires joining adjacent poles as a representation of magnetic binding,] and in which the representations of gravitational fields are formed of pointed cylinders of a plastic material with the points resting on the axes of the representations of the innermost occupied orbits, and in which these components are assembled to form representations of atomic and molecular structure.

*3. A mnemonic educational device of the class described comprising: a spheral element representing atomic nucleus; means for representing orbits surrounding said spheral element, said means including a series of pairs of concentric nestable toroidal members surrounding said spheral element, the axes of all said members being coincident and corresponding to an axis of the spheral element; and means for representing gravitational fields comprising pointed cylindrical elements associated with said orbit designating means, the points of said pointed cylindrical elements resting on the axes of said orbit designating means.*

*4. A mnemonic educational device of the class described comprising: a spheral element representing atomic nucleus; means for representing orbits surrounding said spheral element, said means including paired toroidal members surrounding said spheral element, the axes of said members being coincident and corresponding to an axis of the spheral element; means for representing electrons associated with said toroidal members comprising spheres positionable within the space defined by adjacent toroidal members; and means for representing fields associated with said electron designating means comprising wires fixed to the electron designating means.*

*5. A mnemonic educational device of the class described comprising: means for designating an electron orbit, said means including paired toroidal members whose axes are coincident; in combination with means for representing electrons associated with said toroidal members comprising spheres positionable within the space defined by adjacent toroidal members; and means for designating fields associated with said electron designating means comprising wires fixed to said spheres.*

JOHN M. NOVAK.

REFERENCES CITED

The following references are of record in the file of this patent or the original patent:

UNITED STATES PATENTS

| Number | Name | Date |
|---|---|---|
| 1,851,159 | Dodge | Mar. 29, 1932 |
| 2,052,457 | French | Aug. 26, 1936 |
| 2,477,179 | Hart | July 26, 1949 |

FOREIGN PATENTS

| Number | Country | Date |
|---|---|---|
| 864,090 | France | Apr. 17, 1941 |